(12) United States Patent
Rao et al.

(10) Patent No.: US 8,214,401 B2
(45) Date of Patent: Jul. 3, 2012

(54) TECHNIQUES FOR AUTOMATED GENERATION OF ONTOLOGIES FOR ENTERPRISE APPLICATIONS

(75) Inventors: Aditya Ramamurthy Rao, Mysore (IN); Narni Rajesh, Hyderabad (IN); Bhaskar Jyoti Ghosh, Patna (IN); Keshava Rangarajan, Foster City, CA (US); Pravin Prakash, Ernakulam (IN); Sudharsan Krishnamurthy, Newark, CA (US); Nagaraj Srinivasan, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 12/393,872

(22) Filed: Feb. 26, 2009

(65) Prior Publication Data

US 2010/0228782 A1 Sep. 9, 2010

(51) Int. Cl.
*G06F 17/30* (2006.01)
*G06F 7/00* (2006.01)
(52) U.S. Cl. .................................. 707/794; 707/804
(58) Field of Classification Search .................. 707/794, 707/804
See application file for complete search history.

(56) References Cited

U.S. PATENT DOCUMENTS

| | | | |
|---|---|---|---|
| 6,629,097 B1 | 9/2003 | Keith | |
| 7,155,715 B1 | 12/2006 | Cui et al. | |
| 7,249,100 B2 | 7/2007 | Murto et al. | |
| 7,426,526 B2 | 9/2008 | Chen et al. | |
| 7,761,480 B2 | 7/2010 | Toledano et al. | |
| 7,827,169 B2 | 11/2010 | Enenkiel | |
| 2002/0174117 A1 | 11/2002 | Nykanen | |
| 2004/0098358 A1 | 5/2004 | Roediger | |
| 2004/0213409 A1 | 10/2004 | Murto et al. | |
| 2005/0182792 A1 | 8/2005 | Israel et al. | |
| 2005/0234889 A1 | 10/2005 | Fox et al. | |
| 2006/0048155 A1 | 3/2006 | Wu et al. | |
| 2006/0053098 A1* | 3/2006 | Gardner et al. | 707/3 |
| 2006/0053172 A1* | 3/2006 | Gardner et al. | 707/203 |
| 2006/0165040 A1 | 7/2006 | Rathod et al. | |
| 2006/0184617 A1 | 8/2006 | Nicholas et al. | |
| 2007/0038609 A1 | 2/2007 | Wu | |
| 2007/0055691 A1 | 3/2007 | Statchuk | |
| 2007/0106933 A1 | 5/2007 | Nene et al. | |
| 2007/0150387 A1 | 6/2007 | Seubert et al. | |
| 2007/0162467 A1 | 7/2007 | Wolber et al. | |
| 2007/0168479 A1* | 7/2007 | Bean et al. | 709/223 |
| 2007/0192351 A1 | 8/2007 | Liu et al. | |

(Continued)

OTHER PUBLICATIONS

"An Introduction to RDF and the Jena RDF API," pp. 1-16, downloaded on Dec. 29, 2009 from URL: http://jena.sourceforge.net/tutorial/RDF_API/index.html.

(Continued)

*Primary Examiner* — John E Breene
*Assistant Examiner* — Joshua Bullock
(74) *Attorney, Agent, or Firm* — Kilpatrick Townsend & Stockton LLP

(57) ABSTRACT

Embodiments of the present invention provide techniques for generating ontologies. In one embodiment, techniques are provided for automatically generating an ontology based upon input information. The input information may, for example, be in the form of XSD, XML, WSDL, or WSRP, etc. The automatically generated ontology may be encoded in OWL or other RDF-compliant language. A set of inference rules may also be automatically generated using the input information. The automatically generated ontology and the set of inference rules may be stored in a database for further processing.

16 Claims, 4 Drawing Sheets

U.S. PATENT DOCUMENTS

| | | | |
|---|---|---|---|
| 2007/0208697 | A1 | 9/2007 | Subramaniam et al. |
| 2007/0226242 | A1 | 9/2007 | Wang et al. |
| 2007/0233457 | A1* | 10/2007 | Kang et al. .................. 704/8 |
| 2007/0239674 | A1 | 10/2007 | Gorzela |
| 2007/0299813 | A1 | 12/2007 | Subramaniam et al. |
| 2008/0005194 | A1 | 1/2008 | Smolen et al. |
| 2008/0021881 | A1 | 1/2008 | Subramaniam et al. |
| 2008/0091448 | A1 | 4/2008 | Niheu et al. |
| 2008/0126476 | A1 | 5/2008 | Nicholas et al. |
| 2008/0133960 | A1 | 6/2008 | Wong et al. |
| 2008/0168420 | A1* | 7/2008 | Sabbouh .................. 717/104 |
| 2008/0183674 | A1 | 7/2008 | Bush et al. |
| 2008/0215519 | A1 | 9/2008 | Runge et al. |
| 2008/0275844 | A1 | 11/2008 | Buzsaki et al. |
| 2009/0077094 | A1* | 3/2009 | Bodain ..................... 707/10 |
| 2009/0150735 | A1 | 6/2009 | Israel et al. |
| 2009/0292685 | A1 | 11/2009 | Liu et al. |
| 2010/0010974 | A1 | 1/2010 | Chieu et al. |
| 2010/0017606 | A1 | 1/2010 | Bradley et al. |
| 2010/0057702 | A1 | 3/2010 | Ghosh et al. |
| 2010/0070448 | A1* | 3/2010 | Omoigui .................. 706/47 |
| 2010/0070496 | A1 | 3/2010 | Ghosh |
| 2010/0070517 | A1 | 3/2010 | Ghosh et al. |

OTHER PUBLICATIONS

"Automatic Classification and Taxonomy Generation," Autonomy, pp. 1-3, downloaded on Sep. 10, 2008 from URL: http://www.autonomy.com/content/Functionality/idol-functionality-categorization/index.en.html.

Bechhofer, S., et al, "OWL Web Ontology Language Reference," W3C Recommendation Feb. 10, 2004, pp. 1-71.

"Business Components for Java (BC4J)—Feature Overview," pp. 1-5, downloaded on Apr. 17, 2008 from URL: http://www.oracle.com/technology/products/jdev/htdocs/bc4j9irc_datasheet.html.

U.S. Appl. No. 12/356,314, filed Jan. 20, 2009, Rao et al.

"Classification, Clustering and Information Visualization with Oracle Text," An Oracle White Paper, Feb. 2003, 7 pages.

"Conceptual Search," Autonomy, pp. 1-2, downloaded on Sep. 10, 2008 from URL: http://www.autonomy.com/content/Functionality/idol-functionality-conceptual-search/index.en.html.

"Developing Semantic Web Applications using the Oracle Database 10g RDF Data Model," presented at Oracle Open World 2006, 40 pages.

"Fast ESP," Fast—Solutions—Search—Fast ESP, pp. 1-2, downloaded on Sep. 10, 2008 from URL: http://www.fastsearch.com/13a.aspx?m=1031.

Fast ESP®, "Powering Enterprise Search with Fast ESP®," Copyright 2008, 13 pages.

Fast ESP™, "The world's most intelligent, secure, high-performance search platform," Fast ESP Product Sheet, Copyright 2008, 2 pages.

Fast ESP™, "The world's most intelligent, secure, high-performance search platform," Fast ESP Datasheet, Copyright 2008, 8 pages.

"IDOL Server," Autonomy, pp. 1-8 downloaded on Sep. 10, 2008 from URL: http://www.autonomy.com/content/Products/products-idol-server/index.en.html.

"Information Visualization with Oracle 10g Text," An Oracle White Paper, Oct. 2005, 17 pages.

"Jena Adaptor Release 2.0 for Oracle Database—README," Aug. 2008, pp. 1-9.

"Jena Ontology API," pp. 1-29, last modified on Feb. 24, 2009, downloaded on Dec. 29, 2009 from URL: http://jena.sourceforge.net/ontology/index.html.

Jockers, M. L., "POS Tagging XML with xGrid and the Stanford Log-linear Part-of-Speech Tagger," May 29, 2008, pp. 1-5 downloaded from URL: http://www.stanford.edu/~mjockers/cgi-bin/drupal/node/17.

Muench, S., "Building a Web Store with Struts & BC4J Frameworks," Oracle Technology Network, Oracle Corporation, Sep. 25, 2003, pp. 1-88, downloaded on Apr. 17, 2008 from URL: http://www.oracle.com/technology/sample_code/products/jdev/bc4jtoystore/readme.html.

"Natural Language Processing (NLP)," Autonomy, 2008, 1 page, downloaded on Sep. 10, 2008 from URL: http://www.autonomy.com/content/Functionality/idol-functionality-nlp/index.en.html.

"New Features in Oracle Text with Oracle Database 11g Release 1," An Oracle White Paper, May 2007, 9 pages.

"New Query Features in Secure Enterprise Search 10.1.8.2," An Oracle White Paper, Oct. 2007, 9 pages.

"Oracle 9i XML Developer's Kits Guide—XDK," Release 2 (9.2), Mar. 2002, 22 pages.

"Oracle® Database," Semantic Technologies Developer's Guide, 11g Release 1 (11.1), B28397-02, Sep. 2007, 96 pages.

"Oracle® Secure Enterprise Search," Administrator's Guide, 10g Release 1 (10.1.8.2), E10418-01, Sep. 2007, 326 pages.

"Oracle® Spatial," Resource Description Framework (RDF), 10g Release 2 (10.2), B19307-01, Jul. 2005, 62 pages.

"Oracle Application Development Framework Overview," An Oracle White Paper, Feb. 2006, 12 pages.

"Oracle Business Components for Java," An Oracle Technical White Paper, 1999, pp. 1-38, downloaded on Apr. 17, 2008 from URL: http://www.oracle.com/technology/products/jdev/info/techwp20/wp.html.

"Oracle Database 11g Release 2 Semantic Technologies Using the Jena Adaptor for Oracle Database," Sep. 2009, pp. 1-24.

"OracleOwlPrime," From Owl, pp. 1-5, downloaded Sep. 10, 2008 from URL: http://www.w3.org/2007/OWL/wiki/OracleOwlPrime.

"Oracle Semantic Technologies Inference Best Practices with RDFS/OWL," An Oracle White Paper, Sep. 2009, 11 pages.

"Oracle Text," An Oracle Technical White Paper, Jun. 2007, 28 pages.

Pollock, J., "A Semantic Web Business Case," W3C Semantic Web, Copyright 2008, 6 pages.

"RDF Support in Oracle," Oracle USA Inc., Jan. 2008, 13 pages.

"Search on Structured Data," FAST-Solutions-Search-Search on Structured Data, pp. 1-2, downloaded on Sep. 19, 2008 from URL: http://www.fastsearch.com/13a.aspx?m=1104.

"Searching Enterprise Applications (Siebel 7.8 and e-Business Suite 11i) with Oracle Secure Enterprise Search 10.1.8," An Oracle White Paper, Jan. 2007, 25 pages.

"Searching Oracle Content Server (Stellent) with Oracle Secure Enterprise Search 10.1.8," An Oracle White Paper, Sep. 2007, 25 pages.

"Secure Enterprise Search One Search Across Your Enterprise Repositories: Comprehensive, Secure, and Easy to Use," an Oracle White Paper, Jan. 2007, 11 pages.

"Secure Enterprise Search, Version 1 (10.1.8)," An Oracle Technical White Paper, Jan. 2007, 22 pages.

"Secure Enterprise Search Version 10.1.8.2," An Oracle Technical White Paper, Oct. 2007, 30 pages.

"Secure Enterprise Search Version 10.1.8.2," Oracle Secure Enterprise Search Data Sheet, Nov. 2, 2007, pp. 1-10.

"Secure Searching with Oracle Secure Enterprise Search," An Oracle White Paper, Jan. 2007, 17 pages.

"Semantic Data Integration for the Enterprise," An Oracle White Paper, Jul. 2007, 9 pages.

"Semantic Technologies Center," 1 page downloaded on Dec. 29, 2009 from URL: http://www.oracle.com/technology/tech/semantic_technologies/index.html?_template=/oc.

Sirin, E., et al., "Pellet: A Practical OWL-DL Reasoner," 26 pages downloaded on Dec. 29, 2009 from URL: http://www.mindswap.org/papers/PelletJWS.pdf.

"Text Mining with Oracle Text," An Oracle White Paper, Apr. 2005, 8 pages.

The Stanford Natural Language Processing Group, "Stanford Log-linear Part-Of-Speech Tagger," pp. 1-3, downloaded on Sep. 2, 2008 from URL: http://nlp.stanford.edu/software/tagger.shtml.

W3C®, "OWL Web Ontology Language Guide," W3C Recommendation, Feb. 10, 2004, pp. 1-34.

W3C®, "RDF Primer," W3C Recommendation, Feb. 10, 2004, pp. 1-118.

W3C®, "RDF Semantics," W3C Recommendation, Feb. 10, 2004, pp. 1-41.

W3C®, "RDF Test Cases," W3C Recommendation, Feb. 10, 2004, pp. 1-31.

W3C®, "RDF Vocabulary Description Language 1.0: RDF Schema," W3C Recommendation, Feb. 10, 2004, pp. 1-26.

W3C®, "RDF/XML Syntax Specification (Revised)," W3C Recommendation, Feb. 10, 2004, pp. 1-55.

W3C®, "Resource Description Framework (RFD): Concepts and Abstract Syntax," W3C Recommendation, Feb. 10, 2004, pp. 1-22.

W3C®, "SPARQL Protocol for RDF," W3C Recommendation, Jan. 15, 2008, pp. 1-18.

W3C®, "SPARQL Query Language for RFD," W3C Recommendation Jan. 15, 2008, pp. 1-119.

W3C®, "Web Services Description Language (WSDL) Version 2.0: RDF Mapping," W3C Working Group Note, Jun. 26, 2007, pp. 1-34.

Alonso, O., et al., "Oracle Secure Enterprise Search 10g", Oracle Corporation, 2006, 21 pages.

Author Unknown, "Enterprise Solutions: Google Search Appliance", Google [online], 2007, [retrieved on Apr. 26, 2007]. Retrieved from: http://www.google.com/enterprise/gsa/.

Ford, R., et al., "Secure Searching with Oracle Secure Enterprise Search," Oracle Corporation, 2006, 15 pages.

Risvik, K.,et al., "Search Engines and Web Dynamics," Computer Networks, 2002, vol. 39, No. 3, pp. 289-302.

U.S. Appl. No. 11/742,961, filed May 1, 2007, Notice of Allowance dated Mar. 9, 2010, 7 pages.

U.S. Appl. No. 11/742,961, filed May 1, 2007, Final Office Action dated Dec. 31, 2009, 23 pages.

U.S. Appl. No. 11/742,961, filed May 1, 2007, Office Action dated Jun. 22, 2009, 22 pages.

U.S. Appl. No. 12/201,308, filed Aug. 29, 2008, Advisory Action dated Nov. 9, 2011, 3 pages.

U.S. Appl. No. 12/201,308, filed Aug. 29, 2008, Final Office Action dated Aug. 26, 2011, 9 pages.

U.S. Appl. No. 12/201,308, filed Aug. 29, 2008, Office Action dated Jan. 18, 2011, 10 pages.

U.S. Appl. No. 12/210,420, filed Sep. 15, 2008, Final Office Action dated Nov. 9, 2011, 20 pages.

U.S. Appl. No. 12/210,420, filed Sep. 15, 2008, Office Action dated Apr. 6, 2011, 15 pages.

U.S. Appl. No. 12/212,178, filed Sep. 17, 2008, Advisory Action dated Nov. 2, 2011, 3 pages.

U.S. Appl. No. 12/212,178, filed Sep. 17, 2008, Final Office Action dated Aug. 25, 2011, 18 pages.

U.S. Appl. No. 12/212,178, filed Sep. 17, 2008, Office Action dated Jan. 21, 2011, 17 pages.

U.S. Appl. No. 12/356,314, filed Jan. 20, 2009, Notice of Allowance dated Nov. 22, 2011, 7 pages.

U.S. Appl. No. 12/356,314, filed Jan. 20, 2009, Office Action dated Jul. 22, 2011, 10 pages.

* cited by examiner

TECHNIQUES FOR AUTOMATED GENERATION OF ONTOLOGIES FOR ENTERPRISE APPLICATIONS

BACKGROUND OF THE INVENTION

Embodiments of the present invention relate to ontologies, and more specifically to techniques for automatically generating ontologies for enterprise applications.

Many enterprise applications today rely on the usage of Extensible Markup Language (XML) based data format to exchange and share information such as via the Internet. XML-based data formats that have been used for many enterprise applications may include XML Schema Definition (XSD), Web Services Description Language (WSDL), Web Services for Remote Portlets (WSRP), and others. The use of these XML-based data formats, however, limits many enterprise applications to syntactic integration. This is due to a lack of semantic and relationship representation of enterprise data in XML-based documents since only the syntax and structure of data are defined in the XML-based documents. Accordingly, a different data format is needed to achieve semantic integration for enterprise data.

With the advent of semantic technologies, the importance of ontologies has grown manifold. An ontology is a formal representation of knowledge. An ontology is generally a formal representation of a set of concepts within a domain and relationships between the concepts. Ontologies are being used in several different areas including business analytics, enterprise systems, artificial intelligence and the like, and have the potential to be used in several other fields and applications.

An ontology is typically encoded using an ontology language. Several ontology languages are available. The Web Ontology Language (OWL) has become the industry standard for representing web ontologies. OWL can be used to explicitly represent the meaning of terms in vocabularies and the relationships between the terms. OWL thus provides facilities for expressing meaning and semantics that go far beyond the capabilities of XML-based data formats such as XSD, XML, WSRP, or WSDL. OWL is being developed by the Web Ontology Working Group as part of the World Wide Web Consortium (W3C) Semantic Web Activity. OWL is based on Resource Description Framework (RDF). Further information related to OWL and RDF may be found at the W3C website.

Ontologies are often generated manually. Such manual intervention is, however, both time consuming and error prone. On the other hand, conventional automation tools and methodologies that have been developed for generating ontologies do not meet the enterprise business needs. For example, many of these automation tools and methodologies cannot handle large amounts of enterprise data for generating large ontologies. Accordingly, existing implementations of these automation tools are generally limited to handling only a small amount of enterprise data, and often do not scale well when dealing with large amounts of enterprise data. Many of these tools also lack other desired features.

BRIEF SUMMARY OF THE INVENTION

Embodiments of the present invention provide techniques for generating ontologies. In one embodiment, techniques are provided for automatically generating an ontology based upon input information. The input information may, for example, be in the form of XSD, XML, WSDL, or WSRP, etc. The automatically generated ontology may be encoded in OWL or other RDF-compliant language. A set of inference rules may also be automatically generated using the input information. The automatically generated ontology and the set of inference rules may be stored in a database for further processing.

According to an embodiment of the present invention, techniques are provided for generating an ontology. A system may receive input information in a first format. The input information may be annotated. A first set of annotations and a second set of annotations may be added to the input information. Based upon the annotated input information, an ontology is generated. The ontology is generated in a second format that is different from the first format.

In one embodiment, the first format may be XML or XSD. The second format may be RDF-compliant language such as OWL. The first set of annotations comprises one or more annotations that mark relationships between entities present within the input information. The second set of annotations comprises one or more annotations that can be used to generate one or more rules based on the input information.

In one embodiment, the input information may include an XSD document and an XML document. The XSD document and the XML document may be annotated to generate an annotated XSD file and an annotated XML file. In one embodiment, generating an ontology may comprise converting the annotated XSD file to an OWL schema file, and converting the annotated XML file to an OWL instance file. The OWL instance file may be generated based upon the type of information obtained from the OWL schema file. In one embodiment, converting the annotated XSD file to the OWL schema file may comprise mapping the various XSD elements in the annotated XSD file to their corresponding OWL elements based upon a mapping table.

In one embodiment, generating an ontology may comprise generating a set of one or more rules based upon the annotated input information. In one embodiment, generating an ontology may comprise generating an intermediate ontology in the second format, the intermediate ontology annotated using the second set of annotations; and removing the second set of annotations from the intermediate ontology. An ontology graph may be generated based upon the generated ontology.

The foregoing, together with other features and embodiments will become more apparent when referring to the following specification, claims, and accompanying drawings.

DETAILED DESCRIPTION OF THE INVENTION

Figure 1A:
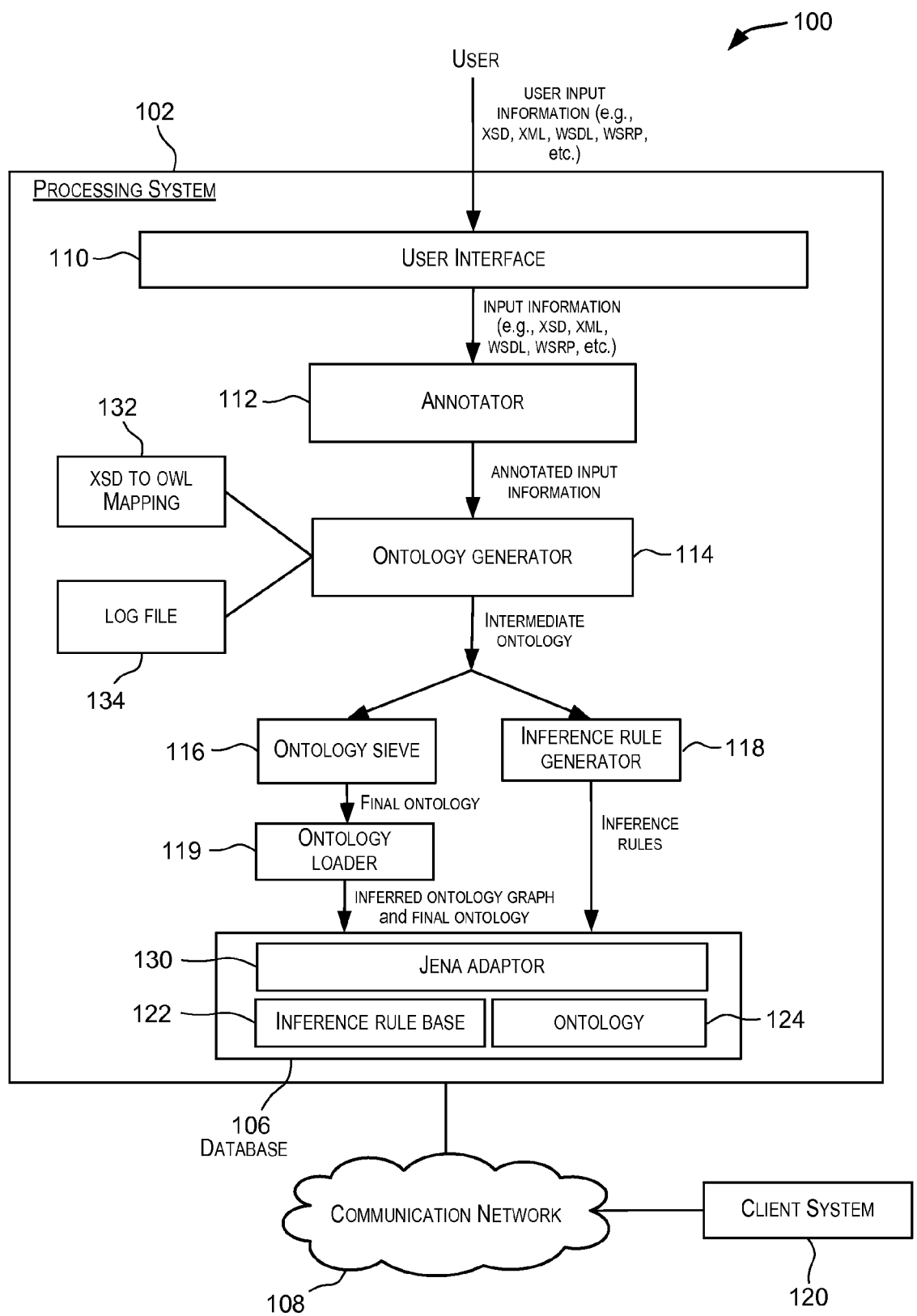
FIG. 1A is a simplified block diagram of a system incorporating an embodiment of the present invention.

In the following description, for the purposes of explanation, specific details are set forth in order to provide a thorough understanding of embodiments of the invention. However, it will be apparent that the invention may be practiced without these specific details.

Embodiments of the present invention provide techniques for generating ontologies. In one embodiment, techniques are provided for automatically generating an ontology based upon input information. The input information may, for example, be in the form of XSD, XML, WSDL, or WSRP, etc. The automatically generated ontology may be encoded in OWL or other RDF-compliant language. A set of inference rules may also be automatically generated using the input information. The automatically generated ontology and the set of inference rules may be stored in a database for further processing.

An ontology is a formal representation of knowledge. An ontology is a formal representation of a set of concepts within a domain and relationships between the concepts. An ontology is typically encoded using an ontology language such as OWL, other Resource Description Framework (RDF) compliant languages recommended by the W3C, and the like. OWL is based upon RDF, which is a W3C specification standard for describing resources on the web. OWL can be used to explicitly represent the meaning of terms in vocabularies and the relationships between the terms. OWL thus provides facilities for expressing meaning and semantics that go far beyond the capabilities of languages such as XML. OWL is being developed by the Web Ontology Working Group as part of the W3C Semantic Web Activity and is geared for use by applications that need to process the meaning of information instead of just presenting the information to humans. In this manner, OWL facilitates greater machine interpretability of information (e.g., Web content) than other languages.

As an example, an ontology can be viewed as a set of ontological statements. Each ontological statement is called a triple as it comprises three parts/terms. They are a subject, a predicate, and an object. A subject identifies the entity that the statement describes, a predicate identifies the property, characteristic, relationship, or attribute of the subject, and the object identifies the value of the predicate. As a specific example, an ontology for a purchasing application may include an ontological statement "Purchase Order X has an owner that is Business Corp" or "Purchase Order X is owned by Business Corp." In the example, "Purchase Order X" is the subject, "owner/own" is the predicate, and "Business Corp" is the object. In ontologies encoded using an RDF-compliant language such as OWL, subjects, predicates, and objects may be represented by triples of Uniform Resource Indicators (URIs). A URI uniquely identifies the subject, or the predicate, or the object. The URIs may or may not identify locations of searchable data corresponding to the entities described by ontological statements.

FIG. 1A is a simplified block diagram of a system 100 incorporating an embodiment of the present invention. As depicted in FIG. 1A, system 100 comprises a processing system 102 that is configured to automate generation of ontologies. The ontologies that are automatically generated by processing system 102 may be encoded in OWL, or any other RDF-compliant language.

In the embodiment depicted in FIG. 1A, processing system 102 comprises several modules that facilitate automated generation of ontologies for enterprise applications (e.g., a purchasing application). These modules include a user interface module 110, an annotator 112, an ontology generator 114, an ontology sieve 116, an inference rule generator 118, an ontology loader 119, and a Jena adapter 130. These modules may be implemented in software (e.g., code, instructions, program) executed by a processor of processing system 102, hardware, or combinations thereof. It should be apparent that the modules depicted in FIG. 1A are not intended to limit the scope of the present invention, as recited in the claims. In alternative embodiments, processing system 102 may have more or less modules than the ones depicted in FIG. 1A.

In the embodiment depicted in FIG. 1A, the ontology (shown as ontology 124) that is automatically generated by processing system 102 is persisted in database 106. Ontology 124 may be encoded in various different languages. In one embodiment, ontology 124 is encoded using an RDF-compliant language such as the OWL web ontology language and may be queried using an RDF-compliant query language such as SPARQL. Ontology 124 may include data for one or more domains. For example, in one embodiment, ontology 124 may include information for an enterprise. In alternative embodiments, ontology 124 may be persisted using other techniques. Ontology 124 may also be stored remotely from processing system 102. For example, ontology 124 may be stored in a remote location accessible to processing system 102 via a communication network such as communication network 108 depicted in FIG. 1A. Further, ontology 124 may also be stored in a distributed manner in a network environment. While only one ontology 124 is depicted in FIG. 1A, it should be apparent that multiple ontologies may be generated by processing system 102 as described in this application.

Communication network 108 may be any network configured for data communication such as a local area network (LAN), a wide area network (WAN), the Internet, and the like. Various different communication protocols may be used to communicate data through communication network 108 including wired and wireless protocols.

User interface 110 provides an interface for receiving input information from a user of processing system 102 and for outputting information from processing system 102. For example, a user of processing system 102 may input enterprise information related to an enterprise application via user interface 110. For example, the information entered by a user of processing system 102 may be information related to a purchasing application such as information related to the buyer and seller, quantity, price, and other information. The information entered by a user may be encoded in a format such as XSD, XML, WSDL, WSRP, or other XML-based format. As mentioned previously, there is a lack of semantic and relationship representation of information in XML-based documents since only the syntax and structure of the information are defined in XML-based documents.

In one embodiment, input information (e.g., enterprise information) may be received from a device or machine other than directly from a user. For example, input information may be provided by a client system 120 located remotely from processing system 102 and coupled communicatively with processing system 102 via communication network 108. Client system 120 may be for example a computer, a mobile device such as a cell phone, a personal digital assistant (PDA), and the like. In such an embodiment, the client system may be configured to provide input information periodically to processing system 102 via communication network 108.

In one embodiment, processing system 102 is configured to automatically generate an ontology and a set of inference rules based upon the input information received by processing system 102. The automatically generated ontology is encoded in a format that is different from the format of the input information. For example, the input information may be in a format such as XSD, XML, WSDL, WSRP, or other XML-based format, while the automatically generated ontology may, for example, be encoded in OWL, or other RDF-compliant language. The automatically generated ontology may then be persisted in a database such as database 106 depicted in FIG. 1A. The set of inference rules that are automatically generated by processing system 102 may also be persisted in database 106. In one embodiment, the set of inference rules may be stored in an inference rule base 122 in database 106. In this manner, input information received by processing system 102 is automatically transformed from an XML-based data format to an OWL-based ontology and a set of inference rules that are capable of representing the relationship and semantics of the input information.

For purposes of simplifying the following description, it is assumed that the ontology that is generated and stored by processing system 102 (e.g., ontology 124) is encoded in OWL. However, this is not intended to limit the scope of the present invention. Ontology 124 may also be generated and stored in any other RDF-compliant language.

In one embodiment of the present invention, the input information received by processing system 102 (e.g., XML, XSD, WSDL, or WSRP) is first annotated to generate annotated input information. In one embodiment, two types of annotations may be inserted into the input information: (1) Relationship annotations are annotations that are added to the input information to mark the inherent relationships between entities of same type (or instances of the same entity) or relationships between two or more different types of entities. For example, an entity may be any one of xsd:element, xsd:complexType, xsd:simpleType, etc., that can be represented by an owl:class in an RDF/OWL complaint language. An example of relationship annotations may be specified as owl:sameAs that relates instances of an owl:class of the same type as same or identical. Another example of relationship annotations may be specified as owl:equivalentClass or owl:intersectionOf that relates two or more entities of different types. (2) Inference annotations are annotations that are added to the input information for generating one or more semantic web rules or inference rules. The inference rules that are generated from the inference annotations may be persisted into database and used for executing queries on the ontology to retrieve related information. These inference rules may be viewed as explicit business rules that are created for the purpose of a specific organization. An example for an inference rule that is generated from the inference annotations may be specified as: IF X is EngineeringChangeOrder with Status="Open" THEN X is equivalent to EngineeringChangeOrder with Priority="High". The inference rule states that EngineeringChangeOrders that have their Status as "Open" are equivalent to those that have their Priority as "High". This inference aims to retrieve all high priority EngineeringChangeOrders (additional related information) when asked for open EngineeringChangeOrders.

In one embodiment, as described below, relationship annotations may be used to transform the input information received by processing system 102 into corresponding OWL ontologies having rich interconnections such that the entities present in the ontology are extensively related or linked to each other via the relationships. As discussed, relationships in OWL ontology may be represented using various OWL constructs such as owl:subClassOf, owl:equivalentClass, owl:subPropertyOf, owl:TransitiveProperty, owl:sameAs, etc. In one embodiment, one or more inferences may be made from the relationships among the entities in the OWL ontology. For example, given relationship annotations that are specified as A owl:subClassOf B and B owl:subClassOf C, it may be inferred from these given relationship annotations that A owl:subClassOf C. The inferences that are derived from the relationship annotations are inherent and implicit rules (universally true) that are different from the inference rules that are derived from the inference annotations.

Annotator 112 is configured to receive input information in a format such as XSD, XML, WSDL, WSRP, or other XML-based format and annotate the input information. The input information may be annotated using customized tags. In one embodiment, the annotations generated by annotator 112 may be placed in the standard <xsd:annotation> using two namespaces 'semrel'(indicating relationship annotations) and 'seminf'(indicating inference annotations) for differentiating these tags from other annotated data.

For example, an input XSD document
    <xsd:element name="Item" type="Itemtype">
may be annotated using the namespace 'semrel' to generate the following annotated XSD document showing an equivalent relationship between two entities in one embodiment:

```
<xsd:element name="Item" type="Itemtype">
    <xsd:annotation>
        <xsd:documentation>
            <semrel:relationships>
                <semrel:sameAs
targetEntity="../../scm/product#Product"/>
            </semrel:relationship>
        </xsd:documentation>
    </xsd:annotation></xsd:element>
```

Accordingly, annotator 112 receives an XSD document as input and generates an annotated XSD document indicating that the 'Item' entity of the annotated XSD document is the same as the 'Product' entity of the product.xsd document. This 'sameAs' relationship may be transformed into 'owl:sameAs', 'owl:equivalentProperty', or 'owl:equivalentClass' in the OWL ontology generated by processing system 102 depending on the specific context that a particular entity is mapped into (whether the entity is going to be mapped into a 'owl:Class' or 'owl:ObjectPropery' or 'owl:Datatype Property'.), as will be described below.

As another example, an input XSD document
    <xsd:element name="EngineeringChangeOrder" type="EngineeringChangeOrderType">
may be annotated using the namespace 'semrel' to generate the following annotated XSD document showing a containment relationship between two entities in one embodiment:

```
<xsd:element name="EngineeringChangeOrder"
type="EngineeringChangeOrderType">
    <xsd:annotation>
        <xsd:documentation>
            <semrel:relationship>
                <semrel:contains min="1" max="unbounded"
                targetEntity ="../../scm/ItemEBO#ItemEBO"/>
                <semrel:contains min="1" max="1"
                targetEntity ="../..//BOMEBO#BillOfMaterials "/>
            </semrel:relationship>
        </xsd:documentation>
    </xsd:annotation>
</xsd:element>
```

Accordingly, annotator 112 receives an XSD document as input and generates an annotated XSD document indicating that the entity 'EngineeringChangeOrder' contains one or more ItemEBO entities and only one BillOfMaterials (BOMEBO) entity. These relationships may be transformed to 'owl:Restriction' with 'owl:minCardinality' and 'owl:maxCardinality' constraints in the OWL ontology generated by processing system 102, as described below.

As another example, an input XSD document may be annotated using the namespace 'seminf' to generate an inference annotation in one embodiment:

```
<xsd:annotation>
    <xsd:documentation>
        <seminf:relationship>
            <seminf:primaryCondition >
              corecom:EngineeringChangeOrderEBO:Status='open'
            </seminf:primaryCondition>
            <seminf:relationshipType="equivalence">
              corecom:EngineeringChangeOrderEBO:Priority='high'
            </<seminf:relationshipType>
        </seminf:relationship>
    </xsd:documentation>
</xsd:annotation>
```

Accordingly, annotator 112 receives an XSD document as input and generates an inference annotation based on the XSD document received. The inference annotation states that those EngineeringChangeOrders that have their Status as "Open" are equivalent to those that have their Priority as "High". In other words, an inference rule may be derived from the inference annotations such as "IF EngineeringChangeOrders with Status="Open" THEN EngineeringChangeOrders with Priority="High". This inference rule is an explicit one and may not be universally true. Its aim is to retrieve all high priority ECOs whenever there is open ECOs. The inference annotations may be transformed into semantic web rules, as will be described below.

The relationship annotations generated by annotator 112 ensure that the information that is input to annotator 112 is annotated to reflect relationships between entities present within the input information. These relationship annotations enable ontologies that are generated by processing system 102 based upon the annotations to have rich interconnectivity among the various entities (entities present in the ontology are extensively linked or related via the relationships). As discussed above, the rich interconnectivity among the entities helps to extract relevant inferences. The inference annotations generated by annotator 112 enable processing system 102 to generate one or more inference rules or semantic web rules. The inference annotations enable extra information to be extracted when executing queries on the ontology. For example, an inference rule that is derived from inference annotations may be specified as "IF EngineeringChangeOrders with Status="Open" THEN EngineeringChangeOrders with Priority="High". This inference rule may be used to extract all high priority ECOs whenever there are open ECOs. The inferences derived from the relationship annotations are inherent and implicit rules that are different from the inference rules derived from the inference annotations.

The following is a list of annotations that may be used to represent relationships for input information received by processing system 102.
  a) Property Annotations
    i. Transitive
    ii. Symmetric
    iii. SubProperty
    iv. Functional
    v. InverseOf
    vi. InverseFunctional
    vii. Equivalent
  b) Class Annotations
    i. Equivalent
    ii. IntersectionOf
    iii. UnionOf
    iv. ComplementOf
    v. OneOf
    vi. DisjointWith
  c) Instance Annotations
    i. SameAs
    ii. DifferentFrom
    iii. AllDifferent The output of annotator 112 is annotated input information that forms the input to ontology generator 114. In one embodiment, ontology generator 114 is configured to generate and output an intermediate ontology. The intermediate ontology that is generated and output by ontology generator 114 may include the inference annotations that were generated by annotator 112. In one embodiment, processing performed by ontology generator 114 comprises automated XSD to OWL schema conversion that converts annotated XSD files to OWL schema files and automated XML to OWL instance conversion that converts annotated XML documents to OWL instances. The following sections describe each of these conversions performed by ontology generator 114.

Automated XSD to OWL Schema Conversion

Figure 1B:
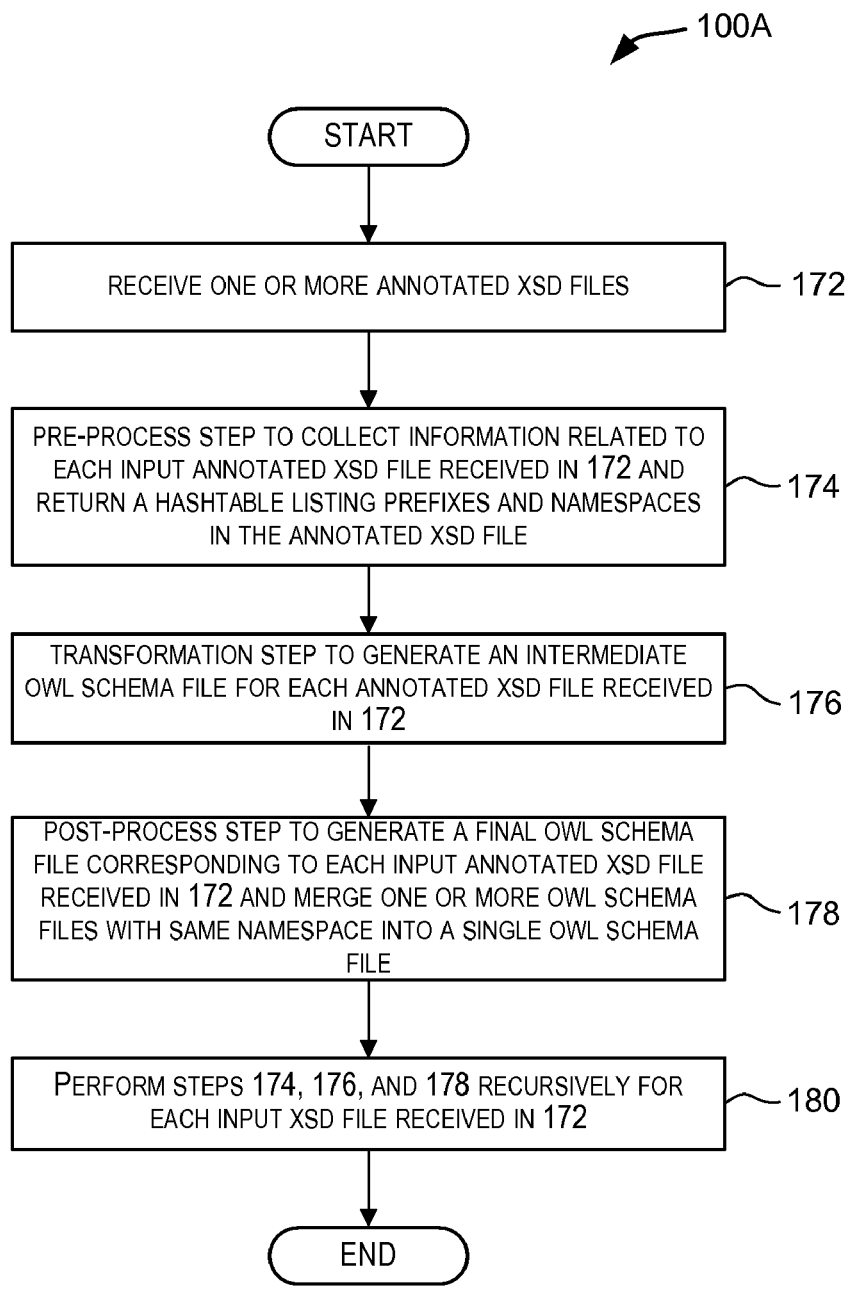
FIG. 1B is a simplified flowchart depicting a method for automatically transforming an XSD document to an OWL schema incorporating an embodiment of the present invention.

FIG. 1B is a simplified flowchart depicting a method for automatically transforming an XSD document/file to an OWL schema incorporating an embodiment of the present invention. The method depicted in FIG. 1B may be performed by software (e.g., code, program, instructions) executed by a processor, in hardware, or combinations thereof. The method depicted in FIG. 1B is not intended to limit the scope of the invention as recited in the claims.

Referring to FIG. 1B, one or more annotated XSD files are received (step 172). For each annotated XSD file that is received in 172, steps 174, 176, and 178 may be performed, as described below. Processing (step 180) then returns to steps 174 176, and 178 recursively for each annotated XSD file received in 172.

A pre-process step (step 174) collects information related to the input annotated XSD file. For example, the information that is collected for the annotated XSD file may include the namespace prefix details, the namespaces and the schema location for the annotated XSD file, and other information related to the annotated XSD file. Based on the information collected in the pre-process step, a hashtable may be returned that lists all the prefixes and their corresponding namespaces that occur in the annotated XSD file. This information may be used to resolve the namespaces issues presented in the intermediate OWL schema file that is generated in step 176, as described below.

A transformation step (step 176) implements the XSD to OWL mapping logic 132 to generate an intermediate OWL schema file from each annotated XSD file received in 172. In one embodiment, the XSD to OWL mapping logic may be provided as an XSL Stylesheet that provides mapping between various XSD elements in the annotated XSD file and the corresponding OWL elements. An example of such a mapping between various XSD elements and their corresponding OWL elements is shown below in Table 1. Also during this step, the annotations (as they appear in the input annotated XSD file) that were generated previously by annotator 112 are added as child elements of rdfs:comment in the intermediate OWL schema file that is generated in step 176.

A post-process step (step 178) uses information collected during the pre-process step to refine the intermediate OWL schema file generated in the transformation step (step 176) to generate a final OWL file corresponding to the input annotated XSD file received in 172. For example, the post-process step may fix various problems related to the intermediate OWL file generated in step 176, such as problems related to imports/includes, namespace prefix problems, problems of duplicate names, and other issues/problems. This step also merges one or more OWLs with the same namespace into a single OWL file. In particular, the following may be performed during the post-process step:

a. Resolve namespaces/prefixes: In an XSD file, each element is prefixed with a namespace (such as corecom) and a colon (:). In OWL, the prefix is replaced by the actual namespace, plus a For this purpose, the hashtable returned by the pre-process step lists all the prefixes and their corresponding namespaces that occur in the XSD file. This information is then used to replace each prefix with its namespace in the final OWL.

b. Resolve duplicate names: The intermediate (temporary) OWL file generated by the transformation step is not a valid OWL file since it may contain elements with duplicate names (in an OWL file, every element in a given namespace should have a unique name). Eliminating these duplicate names on per namespace basis refines the temporary OWL. This may be done by defining each element at the first occurrence and referring to the defined element at each subsequent (duplicate) occurrence.

c. Handle annotations: This step converts the annotations present in the input annotated XSD file to create inherent relationships through the use of various OWL entailments. An example conversion of XSD relationship annotations to inherent relationships in OWL is shown below:

```
        <owl:Class ...>
        ...
<rdfs:subClassOf>
        <owl:Restriction>
                <owl:allValuesFrom
        rdf:resource="http://localhost:8989/EnterpriseObjectLibrary/
        Release2/Core/Common/V2/MERGED_OWL_3#CodeType"/>
                <owl:onProperty>
                        <owl:ObjectProperty rdf:ID="has_ReasonCode"/>
                </owl:onProperty>
        </owl:Restriction>
</rdfs:subClassOf>
...
</owl:Class>
...
<rdf:Description rdf:about="#has_ReasonCode">
        <owl:equivalentProperty rdf:resource="#has_TypeCode"/>
</rdf:Description>
``` d. Merge OWL schema files: In an XSD, an import statement has both the namespace and the schemaLocation, while in an OWL, the import statement has only the namespace. Therefore it is difficult to know the OWL schemafile to which a particular OWL element belongs. Accordingly, in this step, all the OWL files that correspond to the XSD files belonging to same namespace are merged into a single OWL file. For example, the merged OWL schema file may be saved with the name "MERGED_OWL" suffixed with an integer, at the location where the XSD file(s) belong. This solves the problem of namespace prefixes.

In one embodiment, a log file 134 may be maintained to keep track of all the annotated XSD files that have been transformed or converted by ontology generator 114 to corresponding OWL schema files. In this way, log file 134 helps to prevent identical annotated XSD files (e.g., XSDs having the same namespace and schemaLocation as previous XSDs) that are input to the ontology generator 114 at different instances of time from being converted multiple times. For example, log file 134 may keep details of annotated XSD files that have already been converted to corresponding OWL schema files by ontology generator 114. A subsequent identical annotated XSD file that is input to ontology generator 114 will thus not be converted to the corresponding OWL schema file by ontology generator 114. This reduces redundant processing and increases the efficiency of the conversion process.

Log file 134 also helps to determine whether an OWL schema file that is generated for an annotated XSD file is to be merged with another existing OWL schema file or to be written to a new OWL schema file. For example, if an annotated XSD file with a particular namespace is already listed in log file 134, then the corresponding OWL schema file that is generated for a subsequent annotated XSD file having an identical namespace as the previous annotated XSD file listed in the log file will be merged with the existing OWL file. Otherwise, the corresponding OWL schema file that is converted for this subsequent annotated XSD file is serialized to a new OWL schema file.

In the manner described above, XSD to OWL schema conversion generates one or more valid OWL schema files for a set of annotated XSD files input to ontology generator 114 while preventing duplicate XSD files from being converted by ontology generator 114. In one embodiment, valid OWL Schema file(s) may be stored in the same hierarchical directory structures as those of the inputted annotated XSD file(s) in database such as database 106 of FIG. 1A.

TABLE 1

XSD2OWL Mappings

| XSD | OWL |
|---|---|
| xsd:complexType | → owl:Class |
| Global xsd:element | → owl:Class |
| Local xsd:element | |
|   built-in type | → owl:DataTypeProperty |
|   complexType | → owl:ObjectProperty |
| xsd:attribute | |
|   built-in type | → owl:DataTypeProperty |
|   complexType | → owl:ObjectProperty |
| xsd:import | → owl:imports |
| xsd:include | → owl:imports |
| targetNamespace | → xml:base |
| xsd:annotation | → rdfs:comment |
| xsd:minOccurs | → owl:minCardinality |
| xsd:maxOccurs | → owl:maxCardinality |
| xsd:type in | |
|   Local element | → owl:allValuesFrom |
|   Attribute | → owl:allValuesFrom |
| xsd:ref | → rdf:resource |
| xsd:name | → rdf:ID |
| xsd:use | |
|   Optional | → owl:minCardinality = 0 |
|   Required | → owl:minCardinality = 1 |
| xsd:restriction/extension in | |
|   element/complexType | → rdfs:subClassOf |
| xsd:simpleType | → owl:Class |

Automated XML to OWL Conversion

If the user input information is in XML format, then an annotated XML file is provided as input to ontology generator 114. Ontology generator 114 is configured to transform each annotated XML (data) file to a corresponding OWL instance file. The associated OWL schema files that are generated by the XSD to OWL schema conversion, as described above, may be used to facilitate such a transformation, as described below. In one embodiment, ontology generator 114 may be configured to perform the following steps for the automated XML to OWL conversion:

Inputs for the automated XML to OWL conversion
XML (data) document to be transformed
OWL Schema documents generated by the XSD to OWL schema conversion and which are referred by the XML documents
Outputs for the automated XML to OWL conversion
OWL Instance document
Recursively (starting from root) go through each element of the XML (data) file.
Resolve the prefix of XML elements by searching for corresponding attribute in the elements up the hierarchy. In one embodiment, the namespace prefix associated with each element of an XML file is removed and added as one or more attributes for the corresponding OWL element nodes. This is because the namespace prefix that is associated with each element in an XML file is not allowed in an OWL instance file. In this manner, by removing the namespace prefix from each element in an XML file, the problem associated with the prefix of the XML element is resolved.
For each element in the XML document do recursively
Find all its children
For each child node
Determine the namespace associated with the child node.
Determine the OWL schema to which the child node belongs to. For example, if an element is encountered while going through an annotated XML file, first the namespace associated with the element is checked. Based on the namespace associated with the element, the merged OWL schema file corresponding to that namespace is then parsed and details of all the elements of the OWL schema file are stored in a hashtable. For example, the hashtable may keep the details of: (1) fully qualified OWL element name (namepsace plus the element name); and the corresponding (2) OWL element type such as owl:Class or owl: ObjectProperty or owl:DatatypeProperty and (3) the name of the type of the element. This process is may be done only once for each unique namespace. If another element from the same namespace is encountered the next time, the process only needs to look for the information stored in the hashtable.
Obtain the "type information" of the element from the associated OWL schema file. The "type information" refers to the OWL type in the corresponding OWL Schema file for this element.
Create an OWL node based on the "type information" of the element. For example, for each XML node, its type information is first extracted. In OWL, a child node with the name of the XML node with a "has_" prefixed to it is created (e.g., Identification becomes has_Identification). A node with the name of its type is created as its child node (Identification is the type of has_Identification element in the MERGED_OWL_3.OWL Schema file).
Append all the OWL nodes to the current OWL node The above steps are repeated for each of the child elements in the annotated XML file received by ontology generator 114. The following example is part of annotated XML data that shows the Identification element of the XML.

```
<corecom:Identification
    xmlns:corecom="http://xmlns.oracle.com/EnterpriseObjects/
    Core/Common/V2">
  <corecom:ID>
      ECO117
  </corecom:ID>
  <corecom:ContextID>V1</corecom:ContextID>
  ...
</corecom:Identification>
```

The following example is part of the OWL instance created for the XML element shown above when applying the XML to OWL conversion as described above:

```
<has_Identification>
  <Identification
      xmlns="http://localhost:8989/EnterpriseObjectLibrary/
      Release2/Core/Common/V2/MERGED_OWL_3#">
    <has_ID>
        <IdentifierType>
            <hasValue>ECO117</hasValue>
        </IdentifierType>
    </has_ID>
    <has_ContextID>...
        </has_ContextID>
    ...
  </Identification>
</has_Identification>
...
```

As described above, ontology generator 114 takes annotated input information (annotated XSD schema files and annotated XML data files) as its input and automatically converts the annotated input information to an intermediate ontology. Specifically, the intermediate ontology is encoded as a set of one or more OWL documents that include the "inference annotations" that were generated by annotator 112 (the intermediate ontology also sometimes referred to an annotated ontology). As mentioned previously, the relationship annotations that were generated by annotator 112 are converted to inherent relationships in OWL through the use of various OWL entailments by ontology generator 114.

In one embodiment, an ontology sieve 116 is provided that is configured to generate a final OWL ontology from the intermediate ontology that is output by ontology generator 114 and provided as input to ontology sieve 116. For example, ontology sieve 116 may be configured to remove the annotations from the annotated ontology to generate a final ontology. Alternatively, ontology sieve 116 may be configured to re-annotate the final ontology through which the user can add some more annotations (which may be provided using user interface 110), if necessary.

In one embodiment, the intermediate ontology that is output by ontology generator 114 may be input to an inference rule generator 118 that is configured to generate a set of one or more inference rules from the "inference annotations" included in the intermediate ontology. As mentioned previously, inference rules are explicit rules and need not be universally true. For example, an inference rule may be specified as "IF EngineeringChangeOrders with Status="Open" THEN EngineeringChangeOrders with Priority="High". This inference rule may be used to extract all high priority ECOs whenever there is open ECOs. Accordingly, inference rules that are generated by inference rule generator 118 enable extra information be extracted from the intermediate ontology and used when executing queries on the ontology (e.g., SPARQL queries).

The inference rules generated by inference rules generator 118 may then be inserted or seeded into database 106 (e.g., an Oracle database). The inference rules may be seeded into database 106 independently of the OWL ontology stored in database 106. In one embodiment, the inference rules may be stored in an inference rule base 122 in database 106. The inference rules stored in inference rule base 122 may be used for executing SPARQL queries against the OWL ontology model saved in database 106.

In one embodiment, an ontology loader 119 is provided that is configured to persist the final ontology generated by ontology sieve 116 into database 106. The final ontology may be encoded in OWL. Ontology loader 119 may also be configured to generate an inferred ontology model/graph based on the final ontology. For example, ontology loader 119 may use an inference engine such as Pellet to generate the inferred ontology model/graph. This inferred ontology model/graph may also be persisted into database 106.

In one embodiment, for example, in an Oracle database, a query API such as an Oracle Jena adapter 130 may be used for storing ontologies, running inference rules on ontologies, executing SPARQL queries, and creating custom rule bases. Jena adapter 130 enables databases, such as Oracle databases, to handle RDF data. In one embodiment, Jena adapter 130 provides Java APIs that enable users to perform ontology-related functions from within a Java program.

Figure 2:
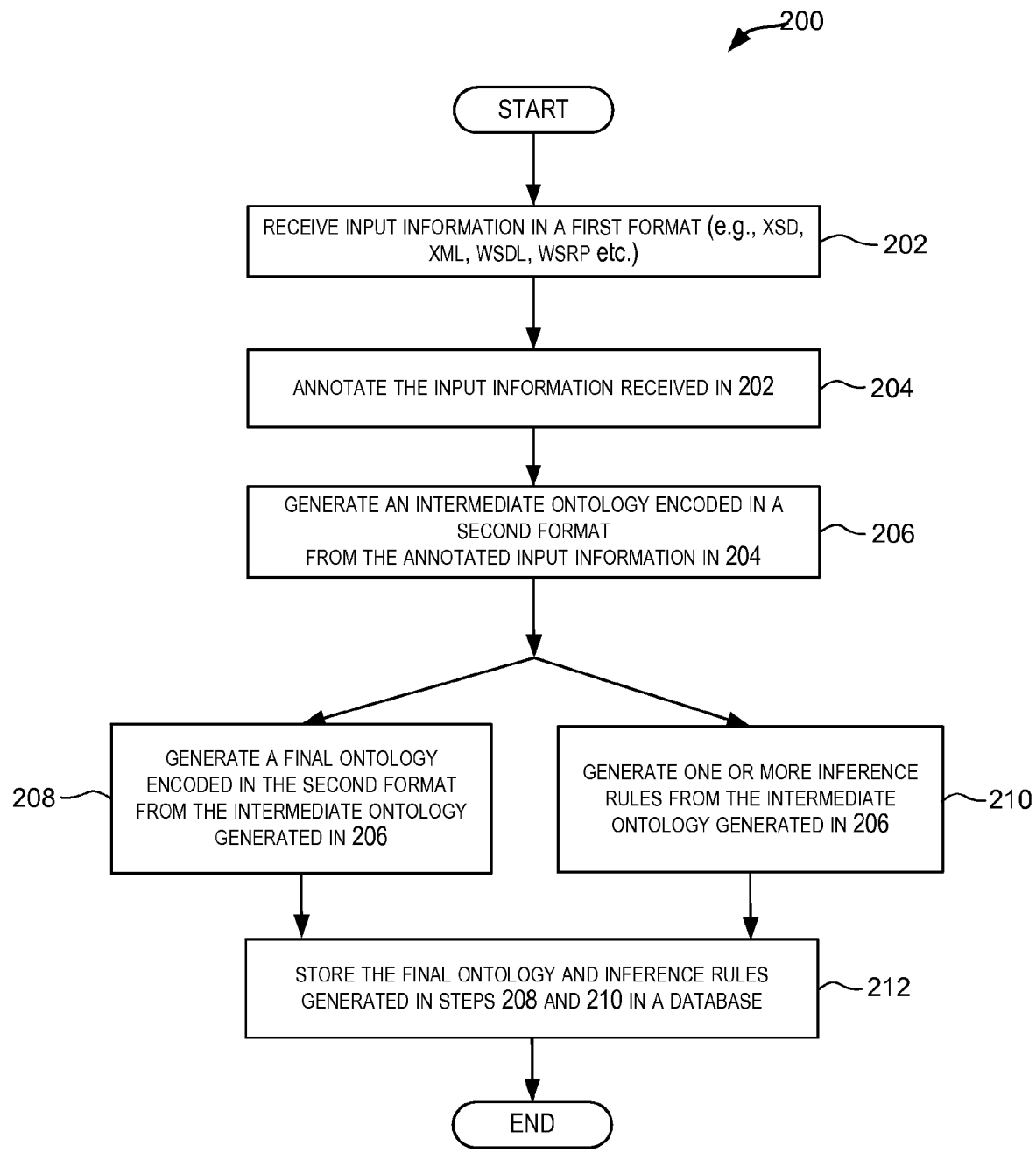
FIG. 2 is a simplified flowchart depicting a method for automatically generating ontologies according to an embodiment of the present invention.

FIG. 2 depicts a simplified flowchart 200 depicting a method for automatically generating one or more ontologies according to an embodiment of the present invention. The method depicted in FIG. 2 may be performed by software (e.g., code, program, instructions) executed by a processor, in hardware, or combinations thereof. The method depicted in FIG. 2 is not intended to limit the scope of the invention as recited in the claims. The embodiment described below assumes that the ontology is generated in an RDF-compliant language such as OWL. However, in alternative embodiments, ontologies may also be generated in other languages.

As depicted in FIG. 2, input information is received (step 202). The input information may be for example enterprise information related to an enterprise application. The input information may be encoded in a first format such as XSD, XML, WSRP, WSDL, etc. For example, one or more XSD/XML files comprising the input information may be received in 202.

The input information received in 202 is then annotated (step 204). In one embodiment, two types of annotations may be performed in 204: relationship annotations and inference annotations. Relationship annotations are annotations made to the input information to reflect relationships between entities present within the input information and across the input information. These relationship annotations enable generation of ontologies that have rich interconnectivity. Inference annotations are annotations made to the input information that are used to generate one or more inference rules. Inference annotations enable extra information to be extracted from the input information and used when executing queries on ontology.

An intermediate ontology is then generated based upon the annotated input information generated in step 204 (step 206). In one embodiment, the intermediate ontology is encoded in a second format that is different from the first format used for inputting information received in 202. For example, if the input information received in 202 is XSD/XML document, the intermediate ontology may be generated in a second language such as OWL that is used for encoding the intermediate ontology. As part of step 206, two conversion processes (XSD to OWL schema and XML to OWL instance) may be performed to generate an intermediate ontology from the annotated input information. As part of the conversion, the relationship annotations present in the annotated input information are transformed into inherent relationships through the use of various OWL entailments, while the inference annotations are included as part of the intermediate ontology generated in step 206.

A final ontology is then generated from the intermediate ontology generated in 206 (step 208). In one embodiment, inference annotations included in the intermediate ontology may be used to generate the inference rules, after which the inference annotations are removed to produce the final ontology. Alternatively, as part of 208, a user can add one or more annotations to the final ontology, if necessary. The additional annotations may be provided via a user interface such as user interface 110 depicted in FIG. 1A. In one embodiment, the final ontology generated in step 208 is encoded in OWL.

A set of one or more inference rules may then be generated from the intermediate ontology generated in step 206 (step 210). The inference rules generated in 210 are explicit rules and need not be universally true. The inference rules can be used to extract extra information from the generated ontology, which may be used for executing queries on the ontology (e.g., SPARQL queries). For example, an inference rule that is generated from the intermediate ontology may be specified as "IF EngineeringChangeOrders with Status="Open" THEN EngineeringChangeOrders with Priority="High". This inference rule may be used to extract all high priority ECOs whenever there is open ECOs. Steps 208 and 210 may be performed in parallel.

The set of inference rules generated in step 210 and the final ontology generated in 208 may then be stored in a database such as database 106 of FIG. 1A (step 212). The set of inference rules generated in 210 may be seeded into the database independently of the OWL ontology stored in database 106.

As described above, techniques are provided for automatically generating an ontology and a set of inference rules based upon input information. The input information may, for example, be in the form of XSD, XML, WSDL, or WSRP, etc. The automatically generated ontology may be encoded in OWL or other RDF-compliant language. This automated generation of ontologies enables semantic and relationship representation of enterprise information that allows for more meaningful and contextually relevant integrations among various enterprise applications. The automated generation of ontologies enables handling of large amounts of enterprise data to generate large ontologies, thereby resolving the scalability problems associated with existing automated tools. The automated generation of ontologies further eliminates manual generation of ontologies, thereby increasing accuracy and reducing the time to development.

Figure 3:
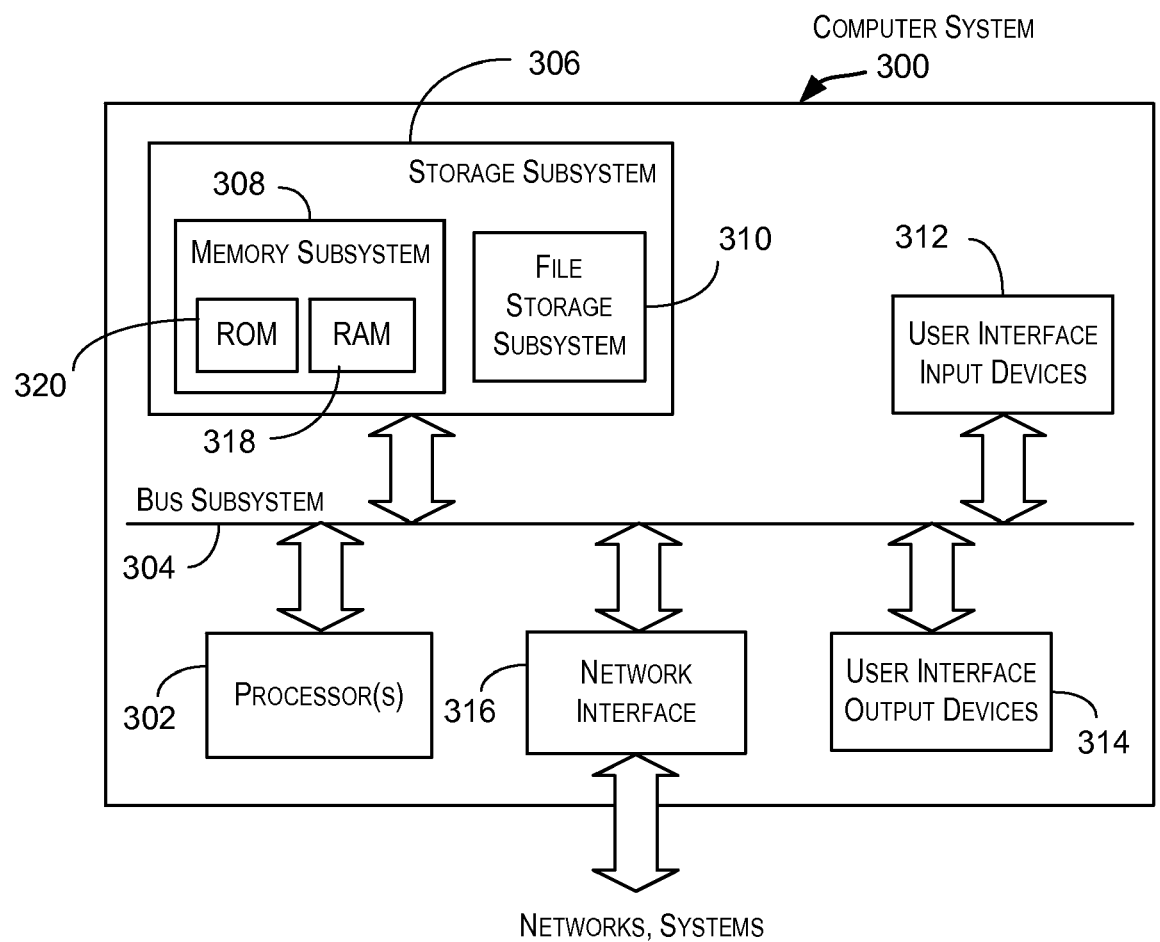
FIG. 3 is a simplified block diagram of a computer system that may be used to practice an embodiment of the present invention.

FIG. 3 is a simplified block diagram of a computer system 300 that may be used to practice an embodiment of the present invention. Computer system 300 may serve as a processing system 102 or a client system 120 depicted in FIG. 1A. As shown in FIG. 3, computer system 300 includes a processor 302 that communicates with a number of peripheral subsystems via a bus subsystem 304. These peripheral subsystems may include a storage subsystem 306, comprising a memory subsystem 308 and a file storage subsystem 310, user interface input devices 312, user interface output devices 314, and a network interface subsystem 316.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Network interface subsystem 316 provides an interface to other computer systems, networks, and portals. Network interface subsystem 316 serves as an interface for receiving data from and transmitting data to other systems from computer system 300.

User interface input devices 312 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 300. A user may use an input device to enter enterprise information as input to the processing system 102 of FIG. 1A.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300.

Storage subsystem 306 provides a computer-readable storage medium for storing the basic programming and data constructs that provide the functionality of the present invention. Software (programs, code modules, instructions) that when executed by a processor provide the functionality of the present invention may be stored in storage subsystem 306. These software modules or instructions may be executed by processor(s) 302. Storage subsystem 306 may also provide a repository for storing data used in accordance with the present invention, for example, the data stored in the diagnostic data repository. For example, storage subsystem 306 provides a storage medium for persisting one or more ontologies and inference rules. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 300 can be of various types including a personal computer, a portable computer, a workstation, a network computer, a mainframe, a kiosk, a server or any other data processing system. Due to the ever-changing nature of computers and networks, the description of computer system 300 depicted in FIG. 3 is intended only as a specific example for purposes of illustrating the preferred embodiment of the computer system. Many other configurations having more or fewer components than the system depicted in FIG. 3 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method for generating an ontology, the method comprising:
   receiving, at a processing system, input information in a first format;
   annotating, at the processing system, the input information to generate annotated input information, wherein;
   the annotating comprises adding a first set of annotations and a second set of annotations to the input information;
   the first set of annotations is comprised of relationships between a plurality of entities present in the input information; and
   the second set of annotations is comprised of annotations that can be used to generate a set of explicit business rules for the purposes of a specific organization, wherein;
   the input information comprises an XSD file and an XML file;
   annotating the input information comprises generating an annotated XSD file and an annotated XML file;
   and wherein generating the ontology comprises:
   converting the annotated XSD file to an OWL schema file; and
   converting the annotated XML file to an OWL instance file based upon the OWL schema file; and
   generating, at the processing system, based upon the annotated input information, an ontology encoded in a second format, wherein the second format is different from the first format.

2. The method of claim 1 wherein the first format is a format encoded using one of Extensible Markup Language (XML), XML Schema Definition (XSD), Web Services Description Language (WSDL), or Web Services for Remote Portlets (WSRP).

3. The method of claim 1 wherein the second format is a format encoded using Resource Description Framework (RDF) compliant language for encoding an ontology.

4. The method of claim 3 wherein the second format uses Web Ontology Language (OWL).

5. The method of claim 1 wherein the second set of annotations comprises one or more annotations that can be used to generate one or more inference rules based on the input information.

6. The method of claim 1 wherein converting the XSD file to the OWL schema file comprises mapping various XSD elements in the annotated XSD file to corresponding OWL elements based upon a mapping table.

7. The method of claim 1 wherein the generating comprises generating a set of one or more rules based upon the annotated input information.

8. The method of claim 1 wherein the generating comprises:
generating an intermediate ontology in the second format, the intermediate ontology annotated using the second set of annotations; and
removing the second set of annotations from the intermediate ontology.

9. The method of claim 1 further comprising generating an ontology graph based upon the generated ontology.

10. A computer-readable storage medium storing a plurality of instructions for controlling a processor to generate an ontology, the plurality of instructions comprising:
instructions that cause the processor to receive input information in a first format;
instructions that cause the processor to annotate the input information to generate annotated input information, wherein:
the instructions that cause the processor to annotate the input information comprise instructions that cause the processor to add a first set of annotations and a second set of annotations to the input information;
the first set of annotations is comprised of relationships between a plurality of entities present in the input information; and
the second set of annotations is comprised of annotations that can be used to generate a set of explicit business rules for the purposes of a specific organization, wherein:
the input information comprises an XSD file and an XML file;
annotating the input information comprises generating an annotated XSD file and an annotated XML file; and
wherein the instructions that cause the processor to generate the ontology comprises:
instructions that cause the processor to convert the annotated XSD file to an OWL schema file; and
instructions that cause the processor to convert the annotated XML file to an OWL instance file based upon the OWL schema file; and
instructions that cause the processor to generate, based upon the annotated input information, an ontology encoded in a second format, wherein the second format is different from the first format.

11. The computer-readable storage medium of claim 10 wherein the first format is a format encoded using one of Extensible Markup Language (XML), XML Schema Definition (XSD), Web Services Description Language (WSDL), or Web Services for Remote Portlets (WSRP).

12. The computer-readable storage medium of claim 10 wherein the second format is a format encoded using Resource Description Framework (RDF) compliant language for encoding an ontology.

13. The computer-readable storage medium of claim 10 wherein the second set of annotations comprises one or more annotations that can be used to generate one or more inference rules based on the input information.

14. The computer-readable storage medium of claim 10 wherein the instructions that cause the processor to generate an ontology comprise instructions that cause the processor to generate a set of one or more rules based upon the annotated input information.

15. The computer-readable storage medium of claim 10 further comprising instructions that cause the processor to generate an ontology graph based upon the generated ontology.

16. A system for generating an ontology, the system comprising:
a memory configured to store the ontology; and
a processor coupled to the memory, wherein the processor is configured to:
receive input information in a first format;
annotate the input information to generate annotated input information by adding a first set of annotations and a second set of annotations to the input information;
wherein:
the first set of annotations is comprised of relationships between a plurality of entities present in the input information; and
the second set of annotations is comprised of annotations that can be used to generate a set of explicit business rules for the purposes of a specific organization, wherein:
the input information comprises an XSD file and an XML file;
annotating the input information comprises generating an annotated XSD file and an annotated XML file; and
wherein generating the ontology comprises:
converting the annotated XSD file to an OWL schema file; and
converting the annotated XML file to an OWL instance file based upon the OWL schema file;
and
generate, based upon the annotated input information, an ontology encoded in a second format, wherein the second format is different from the first format.

* * * * *

UNITED STATES PATENT AND TRADEMARK OFFICE
CERTIFICATE OF CORRECTION

| | | |
|---|---|---|
| PATENT NO. | : 8,214,401 B2 | |
| APPLICATION NO. | : 12/393872 | |
| DATED | : July 3, 2012 | |
| INVENTOR(S) | : Rao et al. | |

It is certified that error appears in the above-identified patent and that said Letters Patent is hereby corrected as shown below:

In column 6, line 34, delete "ObjectPropery" and insert -- ObjectProperty --, therefor.

In column 9, line 9, delete "plus a" and insert -- plus a #. --, therefor.

In column 9, line 54, delete "schemafile" and insert -- schema file --, therefor.

In column 11, line 40-41, delete "(namepsace" and insert -- (namespace --, therefor.

In column 11, line 63, delete "node" and insert -- node. --, therefor.

In column 16, line 27, in Claim 1, delete "wherein;" and insert -- wherein: --, therefor.

Signed and Sealed this
Twenty-fifth Day of September, 2012

David J. Kappos
*Director of the United States Patent and Trademark Office*